United States Patent
Marshall

[11] 3,806,790
[45] Apr. 23, 1974

[54] DUAL BATTERY CHARGER FOR VEHICLES

[75] Inventor: John J. Marshall, Grand Rapids, Mich.

[73] Assignee: Aichele Associates, Inc., Fort Wayne, Ind.

[22] Filed: Dec. 6, 1972

[21] Appl. No.: 312,636

[52] U.S. Cl............... 320/15, 317/16, 317/43, 320/25
[51] Int. Cl............... H02j 7/14, H02h 3/00
[58] Field of Search.......... 320/2, 6, 15, 25, 48, 61; 317/16, 43

[56] References Cited
UNITED STATES PATENTS

| | | | |
|---|---|---|---|
| 3,457,491 | 7/1969 | Black et al.................. | 320/61 X |
| 3,157,870 | 12/1964 | Marino et al................ | 320/48 X |
| 3,654,538 | 4/1972 | Gardberg..................... | 320/25 |
| 3,673,486 | 6/1972 | Snedeker..................... | 320/25 |

Primary Examiner—J. D. Miller
Assistant Examiner—Robert J. Hickey
Attorney, Agent, or Firm—Hobbs & Green

[57] ABSTRACT

A dual battery charger system for vehicles, such as a system for charging an automobile main battery and an auxiliary battery for a camper, a mobile home, a motor home or boat, in which the system has an ignition coil and a unit having a lead connected to the main battery, a lead connected to the auxiliary battery, a switch interconnecting the leads, and a relay coil for closing the switch. Leads interconnect the main battery lead to the relay, and a transistor is disposed in at least one of the two relay leads, the base of which is connected to the ignition coil to sense the operation of the engine and thereby control the current to the relay coil and the current to the auxiliary battery. The system can use a weak sensing signal to control the relay and will respond instantaneously to any condition which would be a drain from the main battery to the auxiliary battery.

5 Claims, 3 Drawing Figures

DUAL BATTERY CHARGER FOR VEHICLES

Recreational vehicles such as campers, mobile homes, motor homes and boats often have a twelve volt electrical system and a battery for supplying the needed current when the vehicles are parked or the boat is not operating. The batteries in the recreational vehicles are recharged from the electrical system of the automobile or truck used in towing the trailer, and motor homes and boats use auxiliary batteries while the engine is not operating and simultaneously charge both batteries when the engine is operating. In order to prevent a drain on the main battery when the engine in the towing vehicle, motor home or boat is not operating, an interrupting component is included in the system which prevents the current from flowing from the main circuit of the engine while the engine is not running. Prior interrupting components have been slow to respond to the current drain and have been unreliable and difficult to install and maintain in effective operating condition. One of the primary objects of the present invention therefore is to provide a dual battery charging system which automatically charges the auxiliary battery when the motor is operating, and automatically disconnects the auxiliary system from the main system when the engine stops, thus preserving the battery in the main system for starting, and avoiding the possibility of permitting the operation of the auxiliary system from running down the main battery.

Another principal object of the present invention is to provide an efficient and reliable solid state electronic and electromechanical circuit for a dual battery charger which involves only three simple easy to make connections during the installation without cutting any wires or making any difficult ignition switch connection.

Still another object of the invention is to provide a dual battery charging system having an interrupter component responsive to a small current indicating engine operation, to prevent discharging of the main battery through the auxiliary battery when the engine is not operating, which senses the condition under which the drain occurs and instantaneously interrupts the flow of current to the auxiliary battery.

A further object is to provide a dual battery charger system of the aforementioned type which is simple in construction and reliable in operation, and which is economical to install, service and operate.

Additional objects and advantages of the invention will become apparent from the following description and accompanying drawings, wherein.

Figure 1:
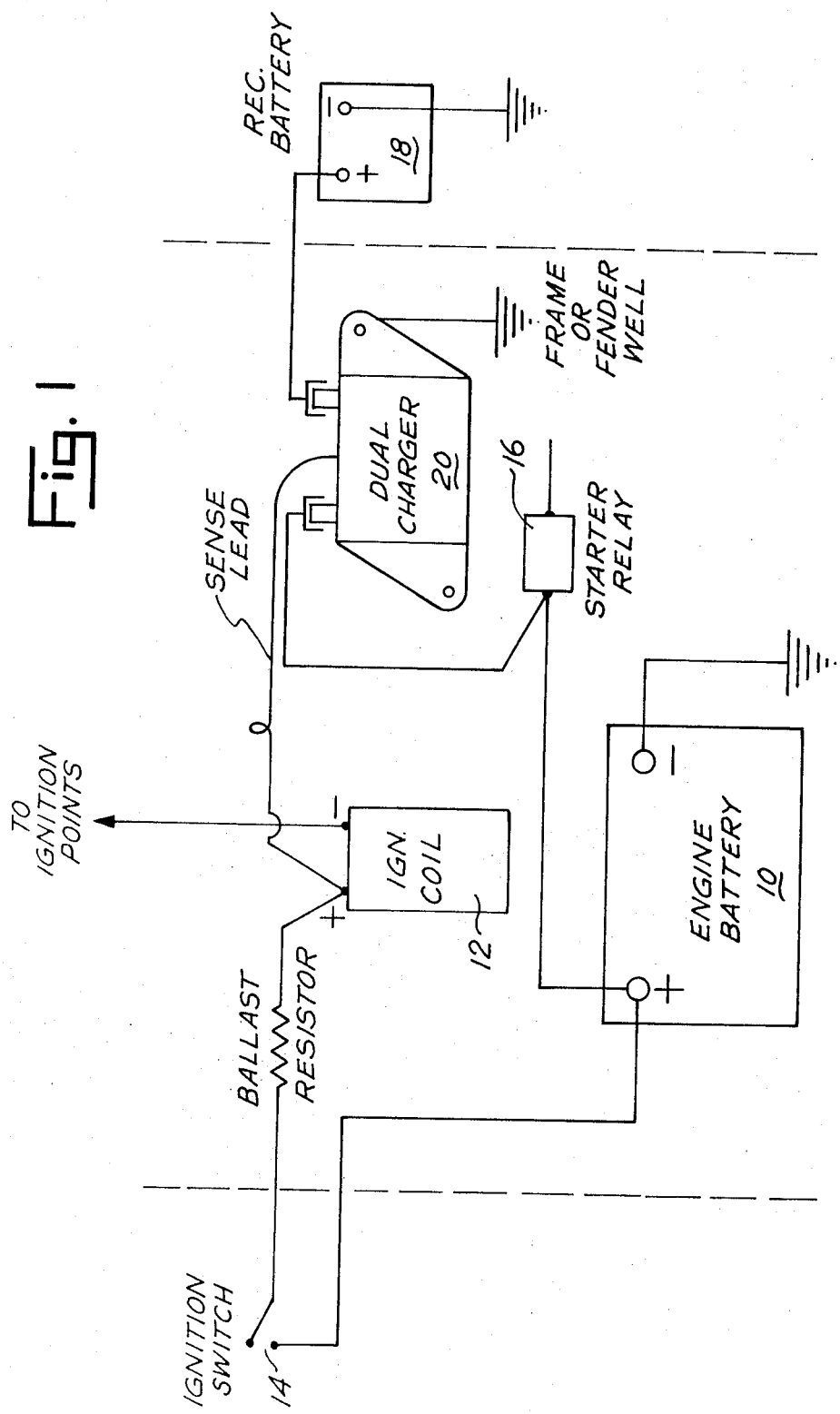
FIG. 1 is a schematic diagram of an electrical system of an automobile and battery of a recreational vehicle, showing the present dual battery charger incorporated therein.

Referring more particularly to the drawings and to FIG. 1 in particular, the various parts of the present dual battery charger system have been labeled in order to facilitate a ready understanding of the system in which the present dual charger is incorporated. In the system shown in FIG. 1, numeral 10 indicates the main battery of the automobile, 12 an ignition coil, 14 the ignition switch, 16 the starter relay, and numeral 18 the battery of the recreational vehicle such as a camper, motor home or boat. The remainder of the system of the recreational vehicle is not shown since the wiring will be considered standard and may be varied to satisfy requirements.

The present dual battery charger is indicated by numeral 20 and can be located at any convenient place on the automobile, normally being installed on the fender well or frame member, and the case 22 and screws 24 which secure the case to the fender well or frame form a negative ground connection for the electrical circuit. In a boat, a wire is connected from the dual charger case to a negative of the engine battery, one tab terminal being connected to the engine battery and the other tab terminal being connected to the recreational battery. The electrical system of the towing vehicle for a camper, which normally would be an automobile, or the electrical system for a motor home or motor boat, will not be described in detail further herein, since the details thereof are not essential for a full understanding of the present invention.

Figure 2:
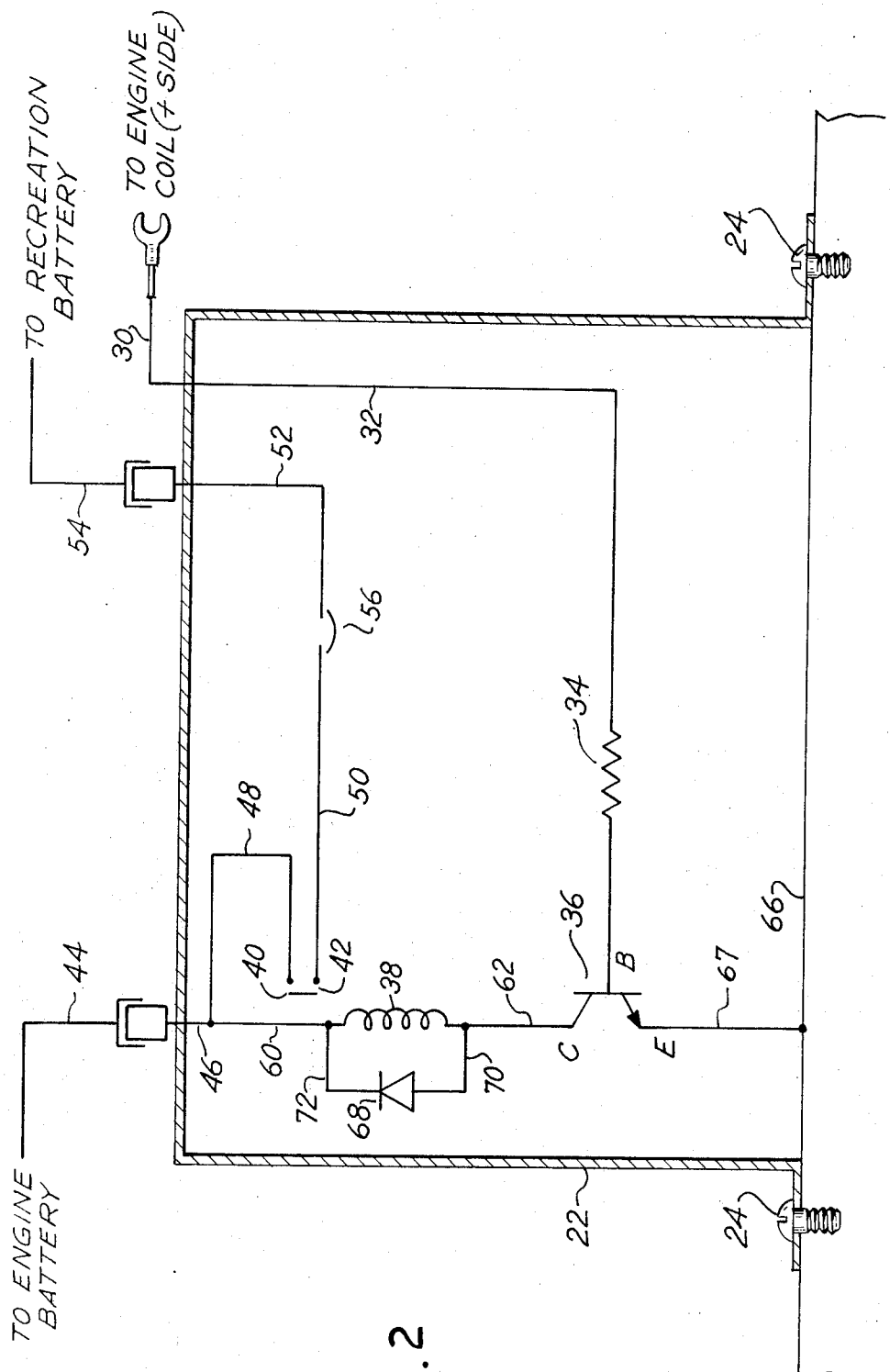
FIG. 2 is a schematic diagram of an embodiment of the present dual battery charger, showing the case therefor in cross section.

In the embodiment of the invention illustrated in FIG. 2, the sensing lead 30 is connected to the positive terminal of the engine coil. Current is conducted through lead 32 to limiting resistor 34 and transistor 36 which control the current to relay 38 to close contacts 40 and 42. The closing of the contacts connects the engine charging system to the recreational battery through leads 44, 46 and 48 on one side of the switch and leads 50, 52 and 54 on the other side of the switch. A thermal circuit breaker 56 is included in lead 50 to protect the relay in the event a short or misconnection occurs, or a misconnection is made in the recreational battery circuit. The circuit for relay 38 includes leads 46 and 60 and collector lead 62 of transistor 36. The emitter of transistor 36 is connected to ground by lead 67. The ground, however, may be made directly through case 22. A diode 68 is connected to leads 60 and 62 to and from relay 38 by its leads 70 and 72, and protects the transistor from reverse EMF caused by the operation of the relay. Transistor 36 is disposed in lead 62 and senses a relatively small current signal from the engine coil to energize the relay and close contacts 40 and 42 to complete the circuit to the auxiliary battery. When the engine stops, the sensing current to the transistor causes the relay to de-energize and open contacts 40 and 42 and immediately interrupts the current flow between the two batteries. The sensing lead, in effect, senses the charging condition of the main battery and causes the circuit to be completed to the auxiliary battery when the main battery is being charged. If preferred, the transistor may be located in lead 60 instead of lead 62.

In the operation of the foregoing dual battery charger, when the engine ignition switch 14 is closed and the engine started, current is supplied to the ignition coil. This activstes the dual charger and connects the engine charging system to the recreational battery 18, thus charging the battery. When the engine is turned off by opening the ignition switch, the dual charger deactivates and disconnects the recreational battery from the engine's charging system, thus preventing the engine battery from being drained when a load is placed on the recreational vehicle battery through the use of the electrical equipment in the recreational vehicle.

The closing of the ignition switch interrupts the flow of the sensing current to transistor 36, causing relay 38 to open the two switch contacts 40 and 42, thus opening the circuit between the engine battery negative lead 44 and the recreational vehicle battery connected to lead 54. Since the transistor responds immediately to the absence of the sensing current from the ignition coil, the relay immediately opens contacts 40 and 42, and those contacts remain open as long as the engine is not running.

Figure 3:
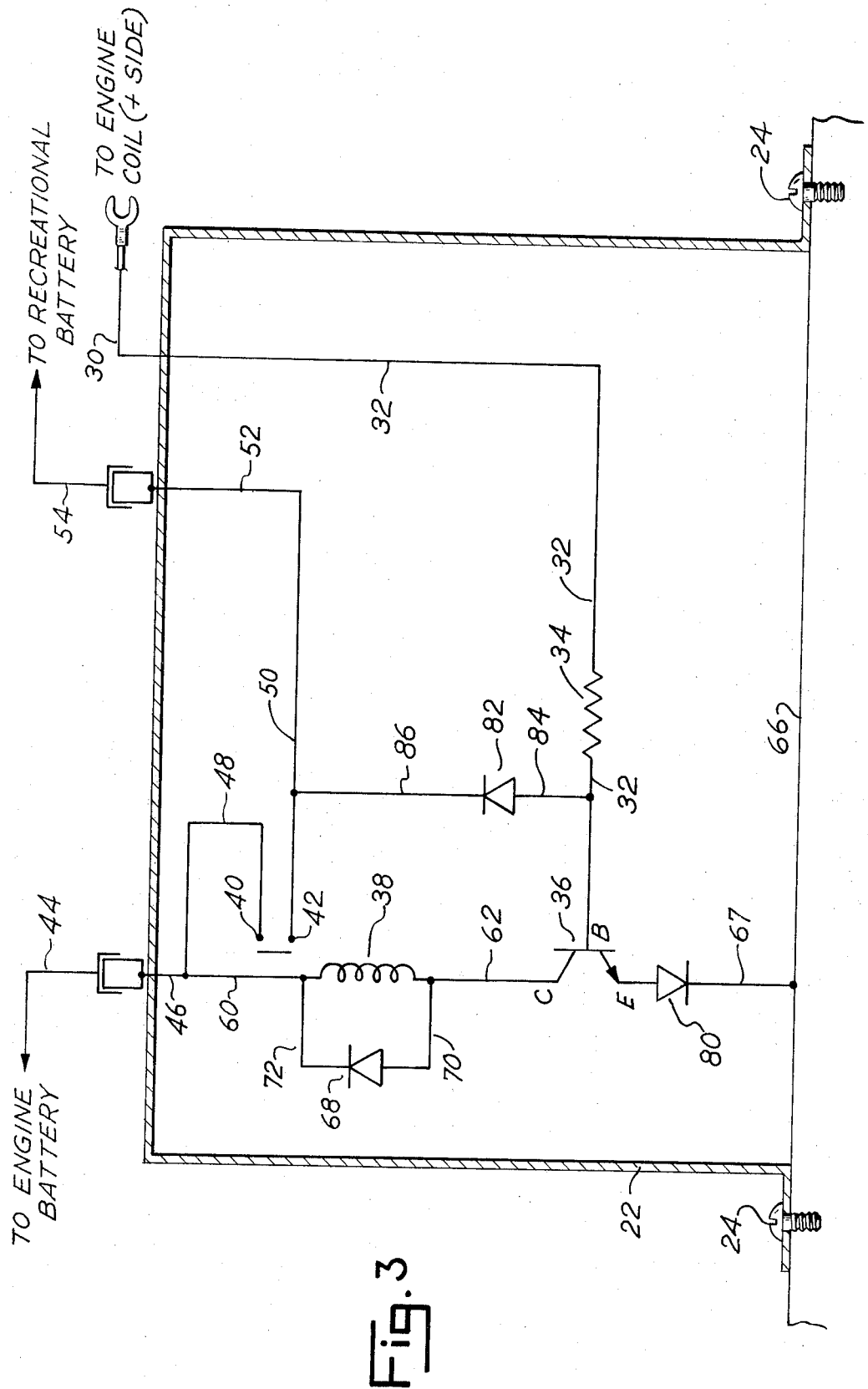
FIG. 3 is a schematic diagram of an embodiment of the dual battery charger showing the case therefor in cross section and illustrating a modified form of the dual charger.

The embodiment of the invention illustrated in FIG. 3 is similar in a number of respects to the embodiment illustrated in FIG. 2, and hence like numerals will be used to described like parts. However, a diode 80 is included in lead 67 and a diode 82 is connected by its leads 84 and 86 between lead 32 and lead 50. Diode 80 is included for the purpose of protecting the transistor if the battery is connected in reverse, and diode 82 protects both the transistor and relay if the output is shorted or the wiring misconnected. Since the diodes only conduct current in one direction, diode 80 blocks reverse current in the event the battery is connected in reverse, therefore protecting transistor 36, whereas diode 82 will not conduct if the dual charger is connected properly. However, if a short occurs, diode 82 becomes ground and removes positive bias from transistor 36, thus deenergizing relay 38. Opening of contacts 40 and 42 relieves the short, and since the action occurs instantaneously, no damage is done to the system. These diodes also eliminate the need for circuit breaker 56 in FIG. 2. In the operation of the dual charger of the embodiment of FIG. 3, a small amount of current is picked up by a sensing wire 30 off the positive terminal of the engine ignition coil. This is conducted through current limiting resistor 34 and to transistor 36. The relay is then energized to close contacts 40 and 42, thus closing the circuit between the engine battery and the recreational vehicle battery. The remaining components of the unit perform in the manner described with reference to FIG. 2, and hence will not be described further with reference to this modified form.

While only two embodiments of the present dual battery charger have been described in detail herein, various changes and modifications may be made without departing from the scope of the invention.

I claim:

1. A dual battery charger for vehicle electrical systems having a main battery, an auxiliary battery and an ignition coil: comprising a lead for connection to the main battery, a lead for connection to the auxiliary battery, a switch interconnecting said leads, a relay coil for closing said switch, leads connecting said main battery lead to said relay and to ground, a transistor in one of said last two mentioned leads, a diode in said ground lead to protect said transistor against misconnection of the battery leads, a lead connected to the base of said transistor and to the ignition coil for sensing charging condition of said main battery and controlling the current to said relay coil, a lead interconnecting the sensing lead and the lead to the auxiliary battery, and a diode in said last mentioned lead, to protect the transistor and relay if the output to the auxiliary battery becomes shorted or is misconnected.

2. A dual battery charger as defined in claim 1 in which a thermal circuit breaker is included in the lead to said auxiliary battery.

3. A dual battery charger as defined in claim 1 in which a current limiting resistor is included in said sensing lead.

4. A dual battery charger as defined in claim 2 in which a current limiting resistor is included in said sensing lead.

5. A dual battery charger as defined in claim 1 in which a shunt is connected around the relay and contains a diode to protect the transistor from reverse EMF caused by relay operation.

* * * * *